United States Patent

Weinmeier et al.

[19]

[11] Patent Number: 5,936,852
[45] Date of Patent: Aug. 10, 1999

[54] SWITCHED MODE POWER SUPPLY WITH BOTH MAIN OUTPUT VOLTAGE AND AUXILIARY OUTPUT VOLTAGE FEEDBACK

[75] Inventors: Harald Weinmeier, Vienna; Volker Potzelberger, Linz, both of Austria

[73] Assignee: Siemens Aktiengesellschaft Osterreich, Wien, Austria

[21] Appl. No.: 09/231,078

[22] Filed: Jan. 14, 1999

Related U.S. Application Data

[63] Continuation of application No. PCT/AT97/00164, Jul. 10, 1997.

[30] Foreign Application Priority Data

Jul. 15, 1996 [AT] Austria .................................. 1270/96

[51] Int. Cl.$^6$ .................................................. H02M 3/335
[52] U.S. Cl. .............................. 363/21; 363/95; 363/97; 363/131
[58] Field of Search ................................ 363/20, 21, 95, 363/97, 131

[56] References Cited

U.S. PATENT DOCUMENTS

| | | | |
|---|---|---|---|
| 4,387,418 | 6/1983 | Koike ........................................ | 363/97 |
| 5,043,598 | 8/1991 | Maeda et al. ............................. | 363/21 |
| 5,481,450 | 1/1996 | Lee et al. .................................. | 363/21 |
| 5,877,946 | 3/1999 | Fitzgerald ................................. | 363/97 |

FOREIGN PATENT DOCUMENTS

| | | | |
|---|---|---|---|
| 0622890 | 11/1994 | European Pat. Off. ....... | H02M 3/335 |
| 3508895 | 9/1986 | Germany ....................... | H02M 3/335 |
| 4204912 | 8/1993 | Germany ....................... | H02M 3/335 |

*Primary Examiner*—Jeffrey Sterrett
*Attorney, Agent, or Firm*—Thomas R. Vigil

[57] ABSTRACT

Switched mode mains power supply unit having a transformer (Tr), which comprises a primary winding ($L_P$) and at least one secondary winding ($L_S$) as well as an auxiliary winding ($L_H$), having a switch (S) controlled by a control circuit (A), by means of which switch the primary winding is connected to an input direct voltage ($U_E$), having, connected downstream of the secondary winding, a rectifier (D1) together with a filtering means (C1) for producing an output direct voltage ($U_A$) and having a regulator means (K1) for producing a first control variable (St1) for the control circuit (A) in dependence upon the deviation of the output voltage from a first set value ($U_{Ref1}$), wherein the pulse duty ratio and/or the frequency of the control signal of the controlled switch depends upon the control variable, and also having an auxiliary rectifier (D2; Glr) connected downstream of the auxiliary winding ($L_H$) in order to produce an auxiliary direct voltage ($U_H$) for the control circuit and/or other consumers, having an auxiliary regulator (K2) to produce a second control variable (St2) for the control circuit (A) in dependence upon the deviation of the auxiliary direct voltage ($U_H$) from a second set value ($U_{Ref2}$), and having a selector circuit (AS) for priority supply of the control variable of that regulator to the control circuit (A), the actual value of which lies below the associated set value.

6 Claims, 2 Drawing Sheets

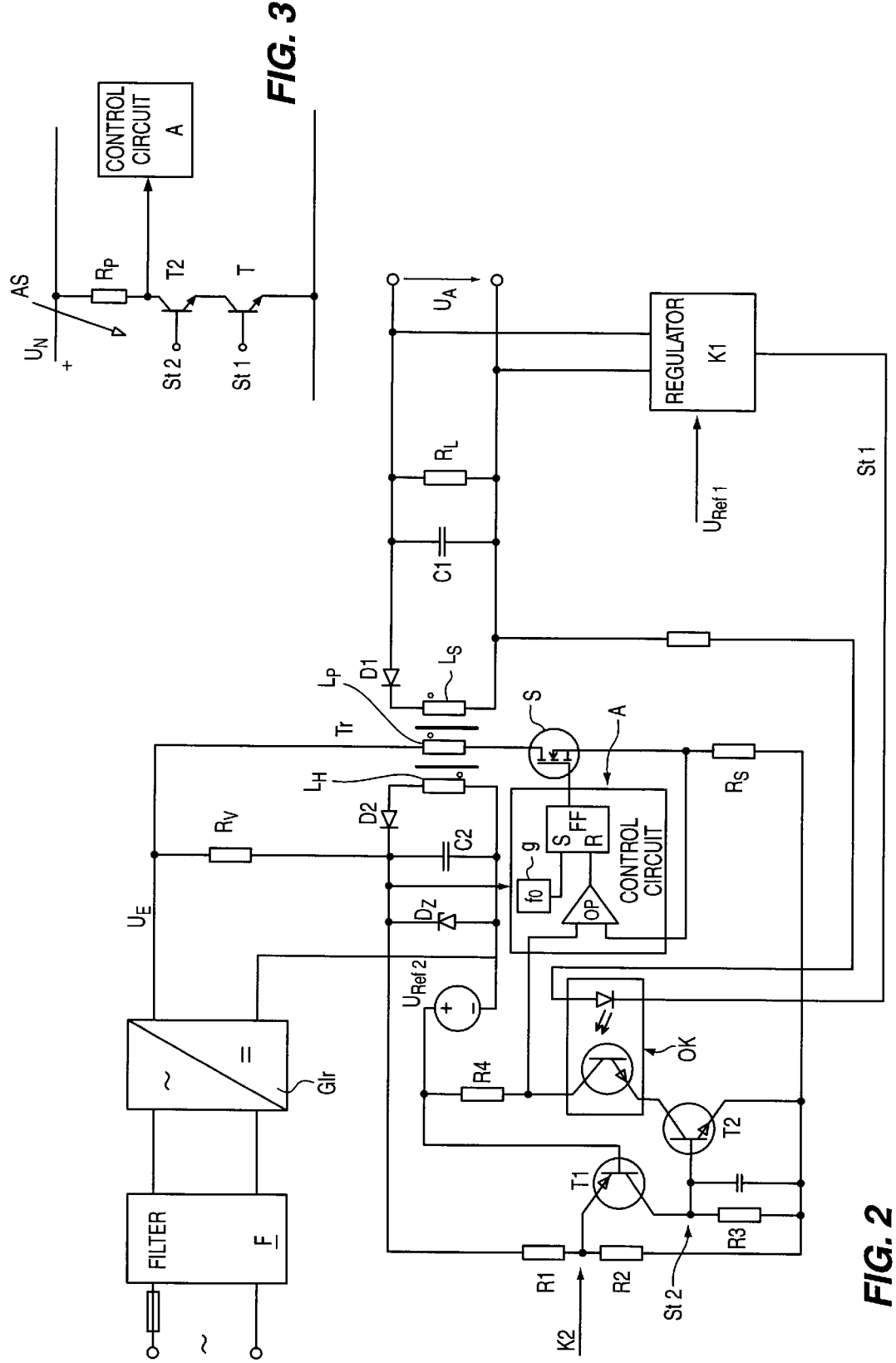

SWITCHED MODE POWER SUPPLY WITH BOTH MAIN OUTPUT VOLTAGE AND AUXILIARY OUTPUT VOLTAGE FEEDBACK

This application is a continuing application of PCT Application No. PCT/AT 97/00164 filed Jul. 10, 1997 which PCT application claims priority from Austrian Application No. A 1270/96 filed Jul. 15, 1996.

BACKGROUND OF THE INVENTION

1. Field of the Invention.

The invention relates to a switched mode mains power supply unit having a transformer, which comprises a primary winding and at least one secondary winding as well as an auxiliary winding, having a switch controlled by a control circuit, by means of which switch the primary winding is connected to an input direct voltage, having, connected downstream of the secondary winding, a rectifier together with a filtering means for producing an output direct voltage and having a regulator means for producing a first control variable for the control circuit in dependence upon the deviation of the output voltage from a first set value, wherein the pulse duty ratio and/or the frequency of the control signal of the controlled switch depends upon the control variable, and also having an auxiliary rectifier connected downstream of the auxiliary winding in order to produce an auxiliary direct voltage for the control circuit and/or other consumers.

Switched mode mains power supply units of this type are used extensively for industrial applications, wherein usually from the alternating current mains by rectification a so-called intermediate circuit voltage is obtained of an order of magnitude of 325 Volts to a maximum of 400 Volts. This intermediate circuit voltage is then the input voltage of the actual switched mode mains power supply unit.

In practice the requirement often arises for parallel connection of a plurality of switched mode mains power supply units, which are in principle of the same type, either because it is desired to cover the power requirement with the aid of a plurality of small units or because, owing to a higher power requirement arising later, it is desired to refit an existing power supply by connecting in one or a plurality of further mains power supply units.

There are different possible approaches for ensuring a parallel connection of a plurality of mains power supply units:

The operating condition of the individual parallel-connected mains power supply units can be detected and controlled centrally, for example, in a microcontroller, computer, PC or the like, or a master-slave structure can be constructed in which one unit assumes a prominent position.

The units which are connected in parallel have no connection to a higher element but are, however of equal status and of the same construction and have their own data channel for data exchange or the mains power supply units are carefully balanced with each other during installation of the parallel connection.

The equal-status, structurally-alike units have no individual connection for the exchange of data and are also not balanced in order to render it possible for them to be connected in parallel. Units of this type should be able to be used with no alteration for individual operation or for parallel connection.

The invention relates to the last-named case and relates to the specific problem that owing to component and manufacturing tolerances the individual mains power supply units can or will have different open-circuit output voltages. If two mains power supply units are connected in parallel the operating condition arises in open-circuit and partial load such that the unit with the higher output voltage during open-circuit determines the common output voltage and during partial load also takes over the whole charge current, and the regulator of the second mains power supply unit establishes an excessively high actual value for the output voltage. The regulator of the unit with a smaller open-circuit output voltage accordingly attempts to lower the output voltage and it reduces the pulse duty ratio and/or frequency of the controlled switch, wherein—owing to the parallel connection of the mains power supply units—it is not the output voltage which can fall but the auxiliary direct voltage, which feeds the control circuit and, where applicable, other components, is lowered until it achieves a value which is inadmissibly low for the current supply to the control circuit and possibly other circuits. This can lead to the complete switch-off of the switching and control electronics and therefore to a "shut-down" of the mains power supply unit. If the current supply is in this condition, i.e., the auxiliary direct voltage is so low in a switched mode mains power supply unit that the control circuit and other electronic/logic parts are switched off and if then the switched mode mains power supply unit switched off in this way must take over current, for example, because of a change in charge, it is first necessary to build up the auxiliary direct voltage so that the control circuit and the controlled switch can be returned to operation. This process requires a certain amount of time of which the duration is determined, for example, by the size of a capacitor on the auxiliary direct voltage and by a relatively high-ohmic auxiliary resistor charging this capacitor from an intermediate circuit voltage. During this time the output voltage in the case of corresponding charge ratios can be interrupted if a great deal of expense has not been invested in buffer capacitors or the like, wherein such interruptions in critical applications are extremely undesirable since they can lead, for example, to loss of data. The same is true in essence even in parallel circuits of more than two mains power supply units.

A switched mode mains power supply unit is known from EP 0 585 789 A1 in which an auxiliary direct voltage produced by an auxiliary winding and an auxiliary rectifier is supplied via the collector-emitter-path of the transistor of an optical coupling device to the control circuit. The voltage arriving therein accordingly changes with the output direct voltage and is used for regulation. The integrated circuit used for the control circuit is thus dimensioned in such a way that the voltage varying in this way also serves to supply current. Regulation of this voltage is generally not considered and the afore-mentioned problems in the parallel connection of a plurality of mains power supply units would consequently occur.

2. Description of the Prior Art.

EP 0 509 343 A2 discloses a feed switched mode mains power supply unit in which an auxiliary direct voltage is used for the control circuit, of which the origin is not explained in detail. The transformer of the mains power supply unit has three windings, namely a primary winding, a secondary winding and a demagnetising winding with a return diode.

The flyback converter shown in DE 35 08 895 A1 has a regulation for two separate output voltages, to which two secondary windings of the transformer are allocated. An auxiliary direct voltage is in this case drawn from the input direct voltage via a longitudinal regulator not explained in more detail, wherein this regulation is completely independent of the actual regulation in the switched mode mains power supply unit. Switching concepts of this type are not effective in particular if the input voltages are relatively high, for example, 230·√2 Volt. The auxiliary direct voltage is in particular only of the order of magnitude of 10 Volts so that the achievement of an auxiliary direct voltage without an auxiliary winding of the transformer consumes energy. The circuit disclosed in the document accordingly also comprises no selector circuit relating to the regulation of the auxiliary direct voltage and/or the regulation of the output voltage.

One object of the invention is thus, in a switched mode mains power supply unit of the representative type, i.e. in one in which the auxiliary direct voltage is produced for the control circuit and possibly other logic circuits with an auxiliary rectifier by means of an auxiliary winding of the transformer, to provide the possibility of preventing an undesired lowering of the auxiliary direct voltage and the associated shut-down of the control circuit and/or further circuit parts in the case of parallel connection of a plurality of switched mode mains power supply units.

This object is achieved with a switched mode mains power supply unit of the classified type, which is characterised in accordance with the invention by an auxiliary regulator to produce a second control variable for the control circuit in dependence upon the deviation of the auxiliary direct voltage from a second set value and by a selector circuit for priority supply of the control variable of that regulator to the control circuit, the actual value of which lies below the associated set value.

If, in the case of switched mode mains power supply units connected in parallel, the above-described operating condition occurs in which a regulator with lower output open-circuit voltage as a result of parallel connections might attempt to lower the output voltage this can only take place to a point at which the auxiliary direct voltage falls to a tenable minimum value. Then the regulation is undertaken by the auxiliary regulator which then ensures the maintenance of the auxiliary direct voltage by means of the control circuit. This condition only changes when the common output voltage falls below its set value because of charging whereby the output voltage regulator comes into action again and the auxiliary regulator moves into the background.

Further features of the invention are characterised in the dependent claims.

BRIEF DESCRIPTION OF THE DRAWINGS

The invention together with further advantages is explained in more detail hereinunder with the aid of exemplified embodiments which are illustrated in the drawing, in which:

FIG. 2 illustrates a more detailed circuit diagram of an embodiment of the invention and FIG. 3 illustrates the principle of the selector circuit used in the embodiment in accordance with FIG. 2.

DESCRIPTION OF THE PREFERRED EMBODIMENT(S)

Figure 1:
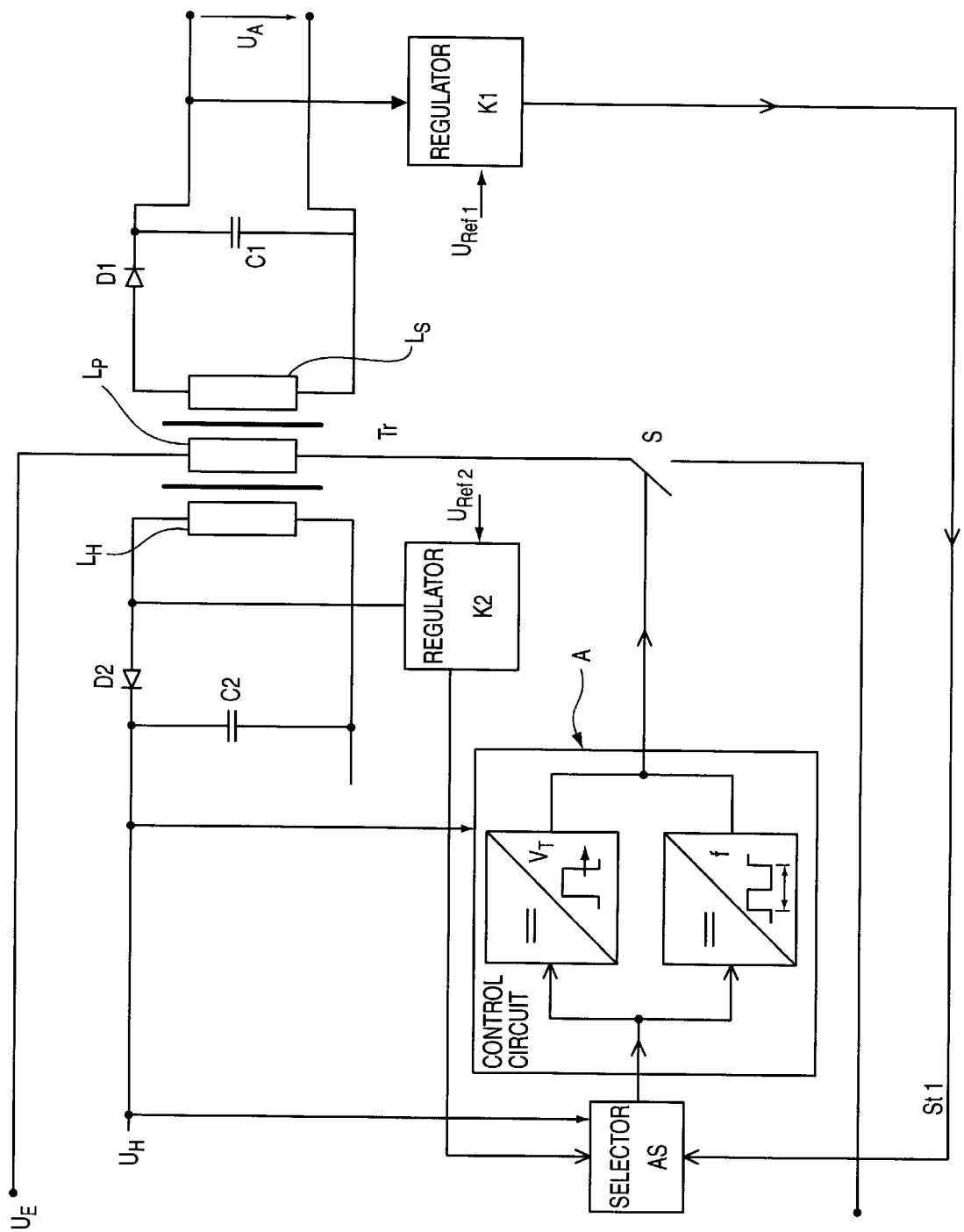
FIG. 1 illustrates a block circuit diagram of a possible embodiment of the invention.

The switched mode mains power supply unit illustrated in FIG. 1 has a transformer Tr having a primary winding $L_P$, a secondary winding $L_S$ and an auxiliary winding $L_H$, wherein the primary winding $L_P$ is connected to an input direct voltage $U_E$ by means of a controlled switch S. The switch S, in this example an N-channel FET, is controlled by a control circuit A which in the known manner supplies control pulses to the switch S of which the pulse duty ratio and/or sequential frequency is dependent upon the level of the input voltage of the control circuit. Reference is made with respect to circuits of this type, for example, to EP 421 245 A2 and the literature named in the introduction to the description thereof.

On the secondary side a rectifier D1 and a charge capacitor C1 are connected downstream of the secondary coil $L_S$, to which charge capacitor the output direct voltage $U_A$ is connected. The output direct voltage $U_A$ or a part proportional thereto is compared with a reference voltage $U_{Ref1}$ in a regulator K1 and the output of the regulator K1 is supplied as a first control variable St1 to the input of a selector circuit AS of which the output is connected to the input of the control circuit A.

A rectifier D2 and a charge capacitor C2 are connected downstream of the auxiliary winding $L_H$ of the transformer Tr in order to obtain an auxiliary direct voltage $U_H$ which serves to supply the control circuit A, the selector logic device AS and other logic maintaining means, display means etc, where applicable. A regulator, namely an auxiliary regulator K2 is also allocated to the auxiliary direct voltage and on the basis of a comparison with a second reference voltage $U_{Ref2}$ supplies a second control variable St2 to the control circuit AS.

The operation of the circuit is as follows: If, in normal operation, by parallel connection of the mains power supply unit to one or a plurality of other mains power supply units, the output voltage $U_A$ assumes a higher value than its set value the regulator K1 attempts to lower the output voltage, ie by means of the control circuit A it reduces the pulse duty ratio and/or the frequency of the output signal of the control circuit A, wherein the auxiliary direct voltage $U_H$ also falls. The auxiliary regulator K2, which continuously carries out a comparison of the auxiliary direct voltage $U_H$ with a set value namely $U_{Ref2}$, thus gives out a corresponding signal to the selector circuit AS. This is formed in such a way that it now recognises that in the case of the auxiliary regulator K2 the actual value is below the set value and that it thus supplies the control variable 2 to the control circuit A, while substantially neglecting the control variable St1 of the regulator K1, so that the regulating circuit exists exclusively or almost exclusively on the primary side in the form $L_H$–D2, C2–K2–AS–A–S–$L_P$. The auxiliary direct voltage $U_H$ is therefore held at a set value below which it cannot fall.

If the charge condition at the output of the mains power supply unit changes again, i.e. UA begins to fall, the regulator K1 enters the condition in which its actual value is lower than the set value and a corresponding control variable St1 occurs at the output of the regulator K1. The selector logic recognizes this condition and then feeds the control variable St1 to the control circuit A, wherein the control variable St2 is neglected or substantially neglected. The regulating circuit therefore exists again in the form $L_P$–D1, D1–K1–AS–A–S–$L_P$.

In the embodiment in accordance with FIG. 2 the same reference numbers are used for the same parts as in FIG. 1 or these parts and their operation are not mentioned again. The input voltage $U_E$ is produced from the alternating voltage mains as a so-called intermediate circuit voltage, typically of the order of 325 V by means of a rectifier Glr connected downstream of the filter F. The capacitor C2 to which the auxiliary direct voltage $U_H$ is to be connected is charged via a high-ohmic resistor $R_V$ to a voltage limited by a Zener diode $D_Z$, in order to render possible a "starting-up"

of the circuit when connected to the mains. It should be mentioned at this point that $R_V$ is not dimensioned to supply the control circuit or other circuits. The necessary division of the voltage from, for example, 325 V to, for example, 24 V would, with the currents occurring during operation, lead to undesirably high waste heat at $R_V$.

The control circuit A is only indicated with respect to its connection. It contains a Flip-Flop FF controlled by a timing generator G and an operational amplifier OP. The inverting input of the amplifier OP forms the input of the control circuit and the output signal of a current carrier $R_S$ is to the non-inverting input. The circuit thus far corresponds to the prior art such as, for example, stated above.

The auxiliary direct voltage $U_H$ or a part thereof is compared with the reference voltage $U_{Ref2}$ which lies between the negative pole of $U_H$ and the base of a pnp-transistor T1. The emitter of this transistor T1 is connected to a voltage divider R1/R2, the collector resistor is designated R3. The collector of the transistor T1 is connected to the base of a npn-transistor T2 which with its emitter is connected to the negative pole of the auxiliary direct voltage $U_H$. The collector of the transistor T2 is connected by the emitter-collector path of the npn-transistor of an optical coupling device OK and a collector resistor R4 belonging to the latter to the positive pole of the reference voltage $U_{Ref2}$.

The light emitting diode of the optical coupling device OK is supplied by the output of the regulator K1 and a resistor $R_L$ lies parallel with the capacitor C1 to produce a base charge at the output of the mains power supply unit.

If, after the mains voltage is switched on, the voltage at the capacitor C2 is sufficiently high the control circuit A begins to pulse, wherein it must be ensured that the reference voltage $U_{ref2}$ is already provided. The auxiliary supply voltage $U_H$ then feeds the control circuit A, the transistors and also possibly other logic or display components not shown here, wherein the power is fed in almost exclusively via the winding $L_H$ (and not via $R_V$).

The voltage divider R1/R2 is dimensioned in such a way that the transistor T1 then conducts if the auxiliary direct voltage $U_H$ has exceeded the level required to operate the consumers. If the transistor T1 conducts, the transistor T2 is also fully turned on so that it accordingly has a substantially constant saturation voltage between the collector and emitter. The signal, which is responsible, for example, for the pulse width, at the collector of the optical coupling device OK—the input signal of the control circuit A—is therefore dependent to the greatest extent only upon the collector-emitter voltage of the optical coupling device transistor and therefore upon the control variable St1. This operating condition is retained by the mains power supply unit in all operating conditions with the exception of the parallel connection in the case of increased output voltage, which will be explained hereinafter.

If a mains power supply unit is connected at the output side in parallel with one (or a plurality of) mains power supply unit(s) which comprise(s) a higher open-circuit output voltage the mains power supply unit, having lower output voltage in the case of open-circuit or partial load of the common output, recognizes an excessively high actual value for the output voltage, wherein by means of the regulator 1 and the control variable St1 the transistor of the optical coupling device OK is fully turned on. As a result the control circuit A blocks the switch S completely or almost completely by lowering the pulse duty ratio and/or frequency. The consumers connected to the auxiliary direct voltage $U_H$, such as the control circuit A then discharge C2 until the transistor T1 is blocked—owing to the prevailing of $U_{ref2}$—and the regulation is undertaken by the control variable St2 and the transistor T2, wherein the auxiliary direct voltage $U_H$ is maintained at a fixed value. This value must of course be above the switch-off threshold of the control circuit A but on the other hand below the auxiliary direct voltage occurring in the case of open-circuit. Moreover a resistor $R_L$ for producing a low base charge is connected in parallel with the capacitor C1, i.e. with the output of the mains power supply unit since otherwise—in the case of failure of any charge—an excessive rise in the output voltage could occur during open-circuit.

The selection principle used in the circuit in accordance with FIG. 2 is briefly illustrated again in FIG. 3 in a more simplified manner. The transistors T2 and T correspond to the transistors T2 and the optical coupling device transistor in FIG. 2, the pull-up resistor $R_P$ corresponds in principle to the resistor R4 in FIG. 2. The two control variables St1 and St2 are supplied to the bases of the transistors T2 and T, the collector of the transistor T2 is connected to the input of the control circuit A. As in this case, no optical coupling device is generally required although it is useful owing to the simple potential separation.

It must also be clear that within the framework of the invention other embodiments of the selector circuit are possible which use gate component or diode and resistor or transistor logic devices.

We claim:
1. Switched mode power supply
    having a transformer, which comprises a primary winding and at least one secondary winding as well as an auxiliary winding,
    having a switch controlled by a control circuit, by means of which switch the primary winding is connected to an input direct voltage,
    having, connected downstream of the secondary winding, a rectifier together with a filtering means for producing an output direct voltage and
    having a regulator means for producing a first control variable for the control circuit in dependence upon the deviation of the output voltage from a first set value, wherein the pulse duty ratio and/or the frequency of the control signal of the controlled switch depends upon the control variable, and also
    having an auxiliary rectifier connected downstream of the auxiliary winding in order to produce an auxiliary direct voltage for the control circuit and/or other consumers, characterised by
    an auxiliary regulator to produce a second control variable for the control circuit in dependence upon the deviation of the auxiliary direct voltage from a second set value and
    a selector circuit for priority supply of the control variable of that regulator to the control circuit, the actual value of which lies below the associated set value.

2. Switched mode power supply according to claim 1, characterised in that the first control variable of the selector circuit is supplied via an optical coupling device.

3. Switched mode power supply according to claim 1, characterised in that a capacitor connected downstream of the auxiliary rectifier can be charged by means of a resistor connected to the input direct voltage.

4. Switched mode power supply according to claim 2, characterised in that the selector circuit comprises two transistors connected in series, wherein the two control variables are supplied to the respective transistor inputs, and the output signal arising at a resistor, common to both transistors is supplied to the selector circuit of the control circuit.

5. Switched mode power supply according to claim 4, characterised in that one of the transistors connected in series is the transistor of the optical coupling device.

6. Switched mode power supply according to claim 1, characterised in that a resistor to produce a low base charge is connected in parallel with the output of the mains power supply unit.

* * * * *

UNITED STATES PATENT AND TRADEMARK OFFICE
CERTIFICATE OF CORRECTION

PATENT NO. : 5,936,852
DATED : August 10, 1999
INVENTOR(S) : Harold Weinmeier and Voler Potzelberger Page 1 of 1

It is certified that error appears in the above-identified patent and that said Letters Patent is hereby corrected as shown below:

Claims:
Column 6,
Line 66, "characterised in that" should be -- wherein --;
Line 67, "wherein" should be -- and --;

Column 7,
Line 5, "characterised in that" should be -- wherein --;
Line 6, "the" should be -- a --; (1st occurence)
Line 6, "the" should be -- a --; (2nd occurence)

Signed and Sealed this

Thirtieth Day of October, 2001

Attest:

NICHOLAS P. GODICI
Attesting Officer    Acting Director of the United States Patent and Trademark Office